United States Patent
Wang et al.

(10) Patent No.: US 12,511,795 B2
(45) Date of Patent: Dec. 30, 2025

(54) METHOD, ELECTRONIC DEVICE, AND COMPUTER PROGRAM PRODUCT FOR IMAGE GENERATION

(71) Applicant: Dell Products L.P., Round Rock, TX (US)

(72) Inventors: Zijia Wang, Weifang (CN); Zhisong Liu, Shenzhen (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 319 days.

(21) Appl. No.: 18/129,136

(22) Filed: Mar. 31, 2023

(65) Prior Publication Data

US 2024/0289998 A1 Aug. 29, 2024

(30) Foreign Application Priority Data

Feb. 28, 2023 (CN) .......................... 202310183839.2

(51) Int. Cl.
*G06T 11/00* (2006.01)
*G06T 5/77* (2024.01)
(Continued)

(52) U.S. Cl.
CPC ................ *G06T 11/00* (2013.01); *G06T 5/77* (2024.01); *G06V 10/761* (2022.01); *G06V 10/764* (2022.01); *G06T 2207/20081* (2013.01)

(58) Field of Classification Search
CPC . G06T 11/00; G06T 2207/20081; G06T 5/77; G06V 10/761; G06V 10/764; G06V 10/774

See application file for complete search history.

(56) References Cited

U.S. PATENT DOCUMENTS

2014/0369596 A1* 12/2014 Siskind .................. G06V 10/85
382/158
2018/0137119 A1* 5/2018 Li .......................... H04N 23/63
(Continued)

OTHER PUBLICATIONS

A. Radford et al., "Learning Transferable Visual Models From Natural Language Supervision," International Conference on Machine Learning, arXiv:2103.00020v1, Feb. 26, 2021, 48 pages.

(Continued)

*Primary Examiner* — Ming Wu
(74) *Attorney, Agent, or Firm* — Ryan, Mason & Lewis, LLP (57) ABSTRACT

A method in an illustrative embodiment includes: acquiring an image set, where the image set includes a first plurality of images that can be classified into at least two categories; determining a corner case image set in the image set, where the corner case image set includes a second plurality of images that tend to be incorrectly classified; training an image generator with at least some images in the second plurality of images and first guidance associated with the at least some images; and generating an additional image by the trained image generator with a first image in the second plurality of images and additional guidance, where the additional guidance is different from the first guidance. By means of the technical solutions of the present disclosure, an image generation efficiency can be improved, and the quality of generated images can be enhanced, thereby improving user experience.

20 Claims, 5 Drawing Sheets

(51) Int. Cl.
*G06V 10/74* (2022.01)
*G06V 10/764* (2022.01)

(56) References Cited

U.S. PATENT DOCUMENTS

2022/0036512 A1* 2/2022 Kim .................. G01R 33/5608
2023/0047094 A1* 2/2023 Zhao ......................... G06T 7/73

OTHER PUBLICATIONS

J. Kim et al., "Guiding Deep Learning System Testing using Surprise Adequacy," arXiv:1808.08444v1, Aug. 25, 2018, 12 pages.
A. Dosovitskiy et al., "An Image is Worth 16x16 Words Transformers for Image Recognition at Scale," The International Conference on Learning Representations, arXiv:2010.11929v2, Jun. 3, 2021, 22 pages.
D. A. Hudson et al., "Generative Adversarial Transformers," Proceedings of the 38th International Conference on Machine Learning, Jul. 2021, 13 pages.
Q. Chen et al., "Photographic Image Synthesis with Cascaded Refinement Networks," arXiv:1707.09405v1, Jul. 28, 2017, 10 pages.
P. Isola et al., "Image-to-Image Translation with Conditional Adversarial Networks," IEEE Conference on Computer Vision and Pattern Recognition (CVPR), Jul. 2017, pp. 1125-1134.
T.-C. Wang et al., "High-Resolution Image Synthesis and Semantic Manipulation with Conditional GANs," Proceedings of the IEEE Conference on Computer Vision and Pattern Recognition, Jun. 2018, 10 pages.
T. Park et al., "Semantic Image Synthesis with Spatially-Adaptive Normalization," arXiv:1903.07291v2, Nov. 5, 2019, 19 pages.

* cited by examiner

METHOD, ELECTRONIC DEVICE, AND COMPUTER PROGRAM PRODUCT FOR IMAGE GENERATION

RELATED APPLICATION

The present application claims priority to Chinese Patent Application No. 202310183839.2, filed Feb. 28, 2023, and entitled "Method, Electronic Device, and Computer Program Product for Image Generation," which is incorporated by reference herein in its entirety.

FIELD

Embodiments of the present disclosure generally relate to artificial intelligence technology, and specifically, relate to a method, an electronic device, and a computer program for image generation.

BACKGROUND

If people regard their data as an asset, enhancing people's data means increasing their assets. An expansion operation can be performed on data in a current image set by expanding data such as images in the image set. For example, different internal data sources relative to a current image set may be used, possibly supplemented with image data from external sources. After integrating many internal and external data sources, users may obtain expanded data sets that were previously unavailable, and can use expanded data sets to perform many operations. In this case, the expanded data set can help overcome obstacles such as insufficient samples.

Therefore, it is desirable to generate images in a manner that expands the images in the image set. However, traditional image generation methods often have low efficiency in image generation, and the generated images can exhibit significant quality problems. Therefore, it is difficult under conventional practice to guarantee adequate user experience for users having image generation requirements.

SUMMARY

Embodiments of the present disclosure provide a method, an electronic device, and a computer program for image generation.

In a first aspect of the present disclosure, a method for image generation is provided. The method includes: acquiring an image set, where the image set includes a first plurality of images that can be classified into at least two categories; determining a corner case image set in the image set, where the corner case image set includes a second plurality of images that tend to be incorrectly classified; training an image generator with at least some images in the second plurality of images and first guidance associated with the at least some images; and generating an additional image by the trained image generator with a first image in the second plurality of images and additional guidance, where the additional guidance is different from the first guidance.

In a second aspect of the present disclosure, an electronic device is provided. The electronic device includes: at least one processing unit; and at least one memory coupled to the at least one processing unit and storing instructions for execution by the at least one processing unit, where the instructions, when executed by the at least one processing unit, cause the electronic device to perform actions including: acquiring an image set, where the image set includes a first plurality of images that can be classified into at least two categories; determining a corner case image set in the image set, where the corner case image set includes a second plurality of images that tend to be incorrectly classified; training an image generator with at least some images in the second plurality of images and first guidance associated with the at least some images; and generating an additional image by the trained image generator with a first image in the second plurality of images and additional guidance, where the additional guidance is different from the first guidance.

In a third aspect of the present disclosure, a computer program product is provided. The computer program product is tangibly stored on a non-transitory computer-readable medium and includes machine-executable instructions, where the machine-executable instructions, when executed by a machine, cause the machine to perform any step of the method described according to the first aspect of the present disclosure.

This Summary is provided to introduce the selection of concepts in a simplified form, which will be further described in the Detailed Description below. The Summary is neither intended to identify key features or essential features of embodiments of the present disclosure, nor intended to limit the scope of embodiments of the present disclosure.

BRIEF DESCRIPTION OF THE DRAWINGS

The above and other objectives, features, and advantages of the present disclosure will become more apparent from description herein of example embodiments of the present disclosure, provided in combination with the accompanying drawings. In the example embodiments of the present disclosure, the same reference numerals generally represent the same parts.

In the accompanying drawings, identical or corresponding numerals represent identical or corresponding parts.

DETAILED DESCRIPTION

Illustrative embodiments of the present disclosure will be described in more detail below with reference to the accompanying drawings. Although illustrative embodiments of the present disclosure are shown in the accompanying drawings, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" indicates "at least one additional embodiment." The terms "first," "second," and the like may refer to different or identical objects. Other explicit and implicit definitions may also be included below.

As stated above, traditional image generation methods often have low efficiency in image generation, and the generated images can exhibit significant quality problems. Therefore, it is difficult under conventional practice to guarantee adequate user experience for users having image generation requirements.

Specifically, the purpose of semantic image synthesis is to create realistic images based on semantic descriptions. For this, a system based on a conditional generative adversarial network (GAN) has been proposed for different image-to-image translation tasks, such as semantic tag images, edge photos, day and night, etc. In order to counter the instability of adversarial training, modified perception loss can be used to generate high-resolution image slices. For example, an adversarial loss and multi-scale generator and discriminator architecture has been proposed to generate high-resolution images with realistic textures and fine details. A spatial self-adaptive normalization layer has also been proposed to use input semantic layout adjustment to activate and effectively transmit semantic information across a network.

To at least partially solve the above problems and one or more of other potential problems, embodiments of the present disclosure provide an image generation method.

Unlike the traditional semantic image synthesis work, which allows users to synthesize images with a certain number of semantic ideas related to semantic tags, the technical solution according to embodiments of the present disclosure focuses on modifying an input image according to input guidelines and prompts including input words.

Moreover, another problem to be solved by embodiments of the present disclosure is to train a model from scratch, rather than fine-tune a StyleGAN model commonly used in the current data synthesis algorithm.

Figure 1:
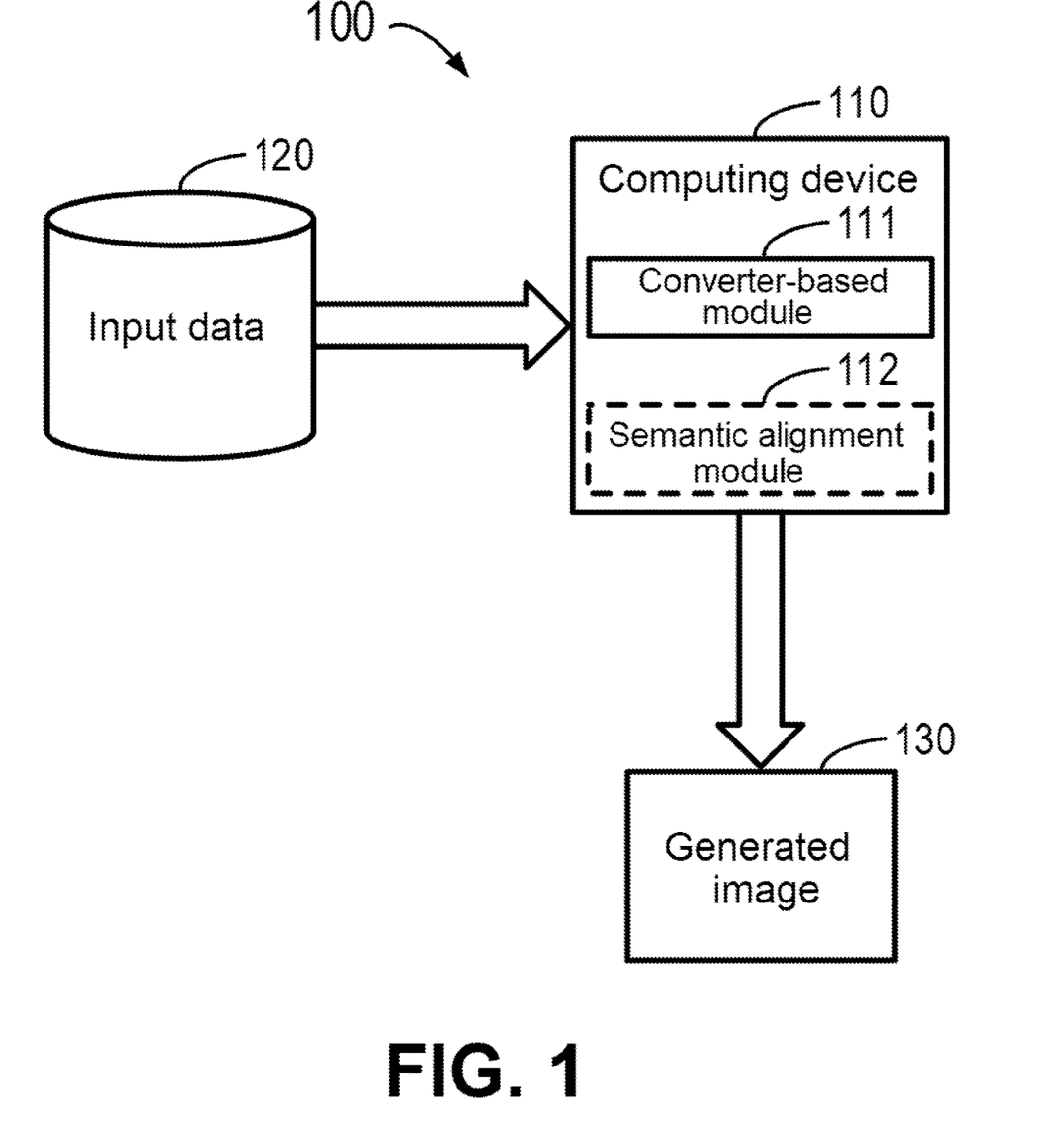
FIG. 1 shows a schematic diagram of an example image generation environment in which a device and/or a method according to embodiments of the present disclosure can be implemented.

FIG. 1 shows a schematic diagram of example image generation environment 100 in which a method for image generation according to some embodiments of the present disclosure can be implemented. According to embodiments of the present disclosure, image generation environment 100 can be a cloud environment.

As shown in FIG. 1, image generation environment 100 includes computing device 110. In image generation environment 100, an image set including, for example, an initial image, also referred to as to-be-expanded image data, can be provided to computing device 110 as input data 120. Meanwhile, guidance associated with a generated image can also be provided to computing device 110 as input data 120. At this time, converter-based module 111 included in computing device 110 can generate, based on the received image set and the guidance, generated image 130 as output.

According to some embodiments of the present disclosure, a prompt associated with the generated image can also be provided to computing device 110 as input data 120. Therefore, computing device 110 may also include optional semantic alignment module 112, and converter-based module 111 and semantic alignment module 112 included in computing device 110 generate, based on the received image set, guidance, and the prompt, generated image 130 as an output.

According to some embodiments of the present disclosure, the guidance and the prompt can both be in the form of images and words.

Studying activities of neurons according to a specific deep learning model is an effective method to evaluate the quality of artificial intelligence test data. In general, the greater the diversity of neuronal activity, the higher the quality of test data will be. In the deep learning model, there are many ways to explain the neuron activities. For example, an activation state of neuron coverage can be interpreted as a behavior of test data points in response to the deep learning model. Similarly, values and symbols output by neurons can be used to characterize activation characteristics of neurons.

In some embodiments, a concept is introduced to characterize the difference between the behavior of the test set and the whole training set. In order to realize this concept, the activation state of neurons in the deep learning model can be first specified. Suppose a set of inputs $X=\{x_1, x_2, \ldots\}$ and a trained deep learning model M are composed of a set of neurons $N=\{n_1, n_2, \ldots\}$. For given test data $x \in X$ and ordered (sub)set of neurons $N \subseteq N$, an activation behavior of x on N (also referred to as an activation trace) is illustratively represented by an activation value vector as follows:

$$\alpha_N(x) = [a_1(x), a_2(x), \ldots, a_{|N|}(x)]^T \quad (1)$$

where each element $a_n(x)$ corresponds to an activation value of x relative to a single neuron n in N. Therefore, a set of activation traces of X is represented as $A_N(X)=\{\alpha_N(x) | x \in X\}$.

Then, $A_N(T_r)$ is calculated based on a training data set $T_r$, where $A_N(T_r)$ records all activation behaviors of all samples in $T_r$. Subsequently, the activation behavior on test data $T_e$ is also obtained as $A_N(T_e)$. Finally, combining $A_N(T_r)$ and $A_N(T_e)$, surprise adequacy (SA) is defined to describe the relative novelty of test input relative to training data. It is illustratively expressed as a quantitative similarity measure between $A_N(T_r)$ and $A_N(T_e)$ in the form of:

$$SA = \text{SimilarityMeasure}(A_N(T_e), A_N(T_r)) \quad (2)$$

Two types of similarity evaluation can be used to formalize surprise adequacy SA. The first type is likelihood-based SA (LSA), and the second type is distance-based SA (DSA). The feasibility of verifying the relative surprise of the two SAs in capturing test data in the deep learning system and interpreting the behavior of test data shows that the surprise adequacy SA is very valuable for evaluating the quality of the test data.

For example, a vision transformer of converter-based module 111 in computing device 110 usually takes a series of vectors as input, which are referred to as tags. The converter is built for sequence modeling. It is completely based on the attention mechanism on the tag and completely abandons loops and convolutions. Because of its great success in the field of natural language processing, converters are increasingly extended to computer vision tasks. For example, an iGPT neural network shows gratifying results in image classification by pre-training the sequence converter with automatic regression of the next pixel prediction and masking pixel prediction tasks. An image can be segmented into small patches, and the patches can be fed to a standard converter (such as ViT) for image classification. The ViT after large-scale training can outperform a convolutional neural network (CNN) equipped with inductive bias. In order to alleviate the high computational complexity problem associated with long sequences and caused by high-resolution images, lightweight converters (e.g., Deformable DETR) for visual tasks can also be used. Meanwhile, converters can also play a great role in low-level visual tasks. However, due to autoregressive prediction, the image converter may be affected by the secondary calculation cost and long reasoning time. Therefore, according to some embodiments of the present disclosure, a converter can adopt a hybrid convolutional neural network CNN converter architecture, which is composed of a CNN head for feature extraction, a converter coder-decoder backbone, and a CNN tail for feature decoding. For example, an image processing converter (IPT) can make full use of the converter architecture through large-scale pre-training, and can achieve good effects in multiple image restoration tasks.

In addition, a binary structure can also be used to maintain the linear efficiency calculation of cross-image remote interaction based on a convolution backbone. According to some embodiments of the present disclosure, the tag-based embedder inherits the network architecture of the converter, has no convolution layer, and can produce good results for high-resolution image synthesis.

According to embodiments of the present disclosure, a problem of detecting a corner case can be formally defined. In addition to the execution of traditional software, a risk condition in artificial intelligence system testing is data processing for corner cases, which usually leads to inaccurate and unexpected behaviors. For example, when an auto drive system based on deep learning is dealing with edge conditions such as wet weather or obvious reflection, it may make wrong choices, which will lead to life and property loss accidents. Therefore, the detection of corner case samples is crucial for artificial intelligence testing. According to the explanation of the corner case, the corner case set can be defined in the following form:

$$\text{Corner\_case\_set: } \{x \mid DL(x + \text{pertubation}) \neq \text{label}(x)\} \quad (3)$$

where x represents a sample under the corner case, and its real label is represented as label (x); and DL(*) is an output class based on a given deep learning model. By means of the definition, it can be seen that when a small disturbance is added to corner case data x, where the disturbance is a small value, so that for a constant ε, 0<|perturbation|≤ε, the category identified by the deep learning system will be different from its actual label. Therefore, a corner case set may contain inaccurate and unexpected behaviors, such as boundary adversarial data and data that are incorrectly classified.

Taking computing device 110 and input data 120 included in FIG. 1 as an example, specific operations performed by computing device 110 after receiving input data 120 will be described in detail with reference to image generation method 200 shown in FIG. 2.

Figure 2:
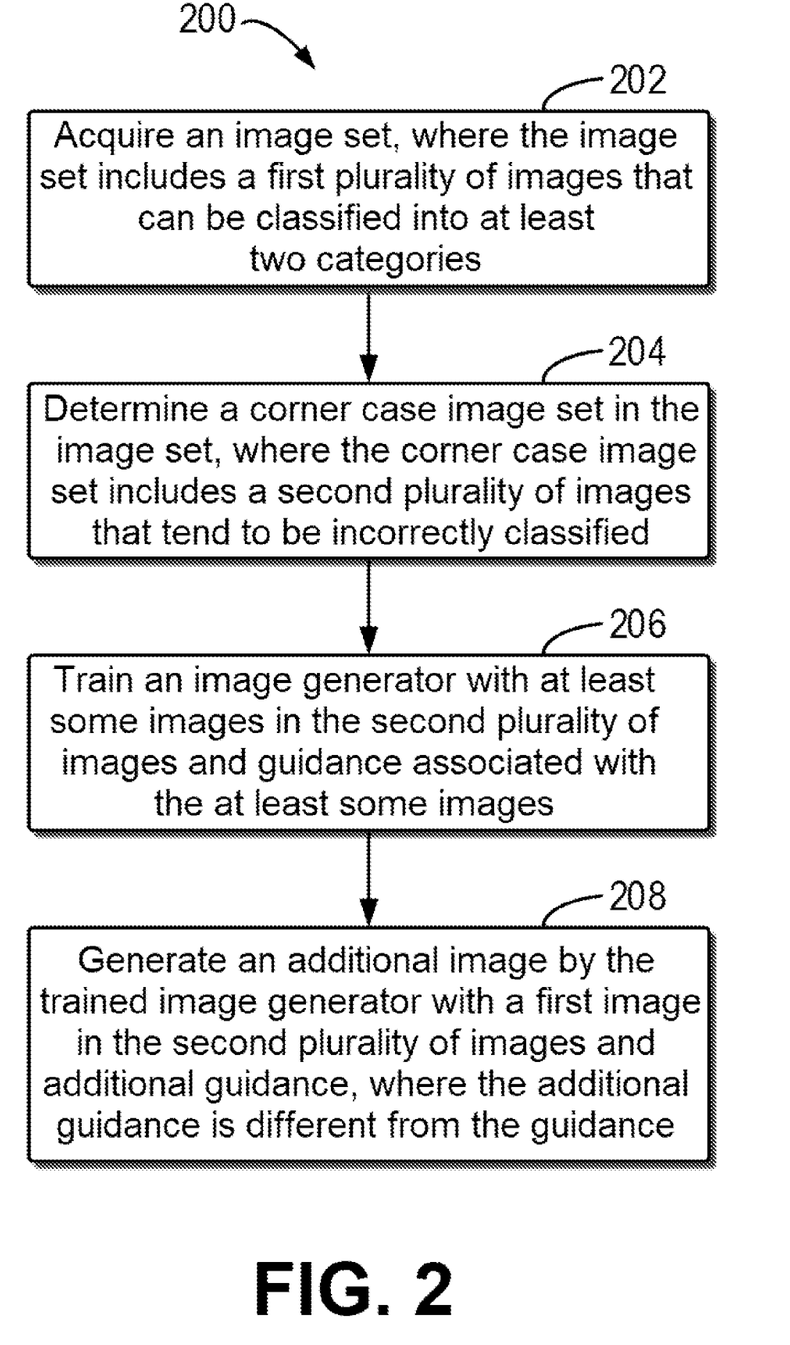
FIG. 2 shows a flow chart of an image generation method according to embodiments of the present disclosure.

FIG. 2 shows a flow chart of image generation method 200 according to embodiments of the present disclosure. Image generation method 200 may be implemented by computing device 110 shown in FIG. 1, or by other appropriate devices. It should be understood that image generation method 200 may also include additional steps that are not shown and/or may omit the shown steps, and the scope of embodiments of the present disclosure is not limited in this aspect. At block 202, computing device 110 acquires an image set. According to embodiments of the present disclosure, the image set includes a first plurality of images that can be classified into at least two categories, and can be provided, for example, by a user to computing device 110 as input data 120. The first plurality of images in the image set can be divided into various categories, for example, whether the image includes specific objects, such as birds, whether the image has special states, such as fog, and so on.

At block 204, computing device 110 determines (manually or according to an algorithm) a corner case image set in the image set, where the corner case image set includes a second plurality of images that tend to be incorrectly classified (including those that have been incorrectly classified or are likely to be incorrectly classified).

According to some embodiments of the present disclosure, computing device 110 can determine the second plurality of images in the image set based on user input as input data 120.

According to some other embodiments of the present disclosure, computing device 110 may determine the second plurality of images in the image set with the likelihood-based surprise adequacy method.

According to another some embodiments of the present disclosure, computing device 110 may determine the second plurality of images in the image set with the distance-based surprise adequacy method.

Figure 3:
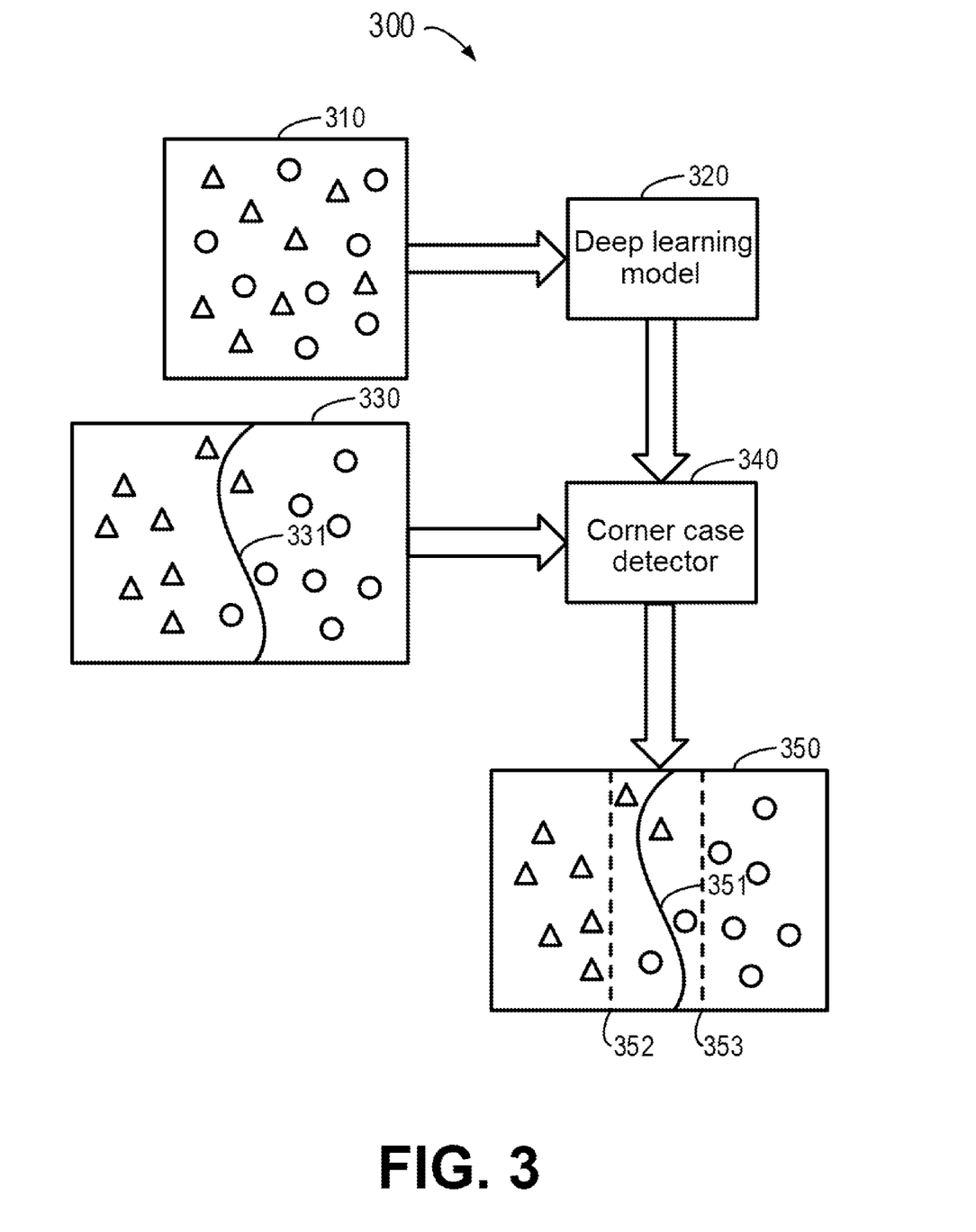
FIG. 3 shows a schematic diagram of a corner case image determining process according to embodiments of the present disclosure.

FIG. 3 shows a schematic diagram of corner case image determining process 300 according to embodiments of the present disclosure. As shown in FIG. 3, training data set 310 may include an image set, which is input to deep learning model 320 for training. Meanwhile, trained deep learning model 320 and test data set 330 are input together to corner case detector 340. Test data set 330 includes classification boundary line 331, whose left and right sides represent two different classifications. It can be seen that a triangle that should be on the left side of classification boundary line 331 is misclassified to the right side of classification boundary line 331, and a circle that should be on the right side of classification boundary line 331 is misclassified to the left side of classification boundary line 331.

Corner case detector 340 may include data set 350 with a determined corner case. It can be seen that data set 350 with the determined corner case is basically the same as test data set 330, and classification boundary line 351 is also included. However, data set 350 with the determined corner case additionally includes two auxiliary lines 352 and 353, the area between auxiliary lines 352 and 353 is a corner case area, and an image in the corner case area is a corner case image.

Therefore, an image close to the classification boundary line is more likely to belong to the corner case image, including an image that has been incorrectly classified or is likely to be incorrectly classified.

Returning to block 204, a distance-based surprise adequacy method is used to determine that the corner case image set may include determining an image classification space for the at least two categories based on the image set. Test data set 330 and data set 350 with the determined corner case in FIG. 3 can be an embodiment of the image classification space. After determining the image classification space, computing device 110 may determine, for a first image in the first plurality of images, a first Euclidean distance between the first image and other images belonging to the same category in the image classification space and a second Euclidean distance between the first image and images belonging to other categories in the image classification space, and may determine, based on the first Euclidean distance and the second Euclidean distance, whether the first image belongs to the corner case image set.

According to embodiments of the present disclosure, determining, based on the first Euclidean distance and the second Euclidean distance, whether the first image belongs to the corner case image set may include determining, based on a ratio of the first Euclidean distance to the second Euclidean distance, whether the first image belongs to the corner case image set.

Another alternative embodiment of the above steps is described in detail below.

According to embodiments of the present disclosure, considering that the surprise adequacy method can be used to capture the behavior of the test data, the surprise adequacy method can be used to represent the behavior of the corner case data. Taking the distance-based surprise adequacy (DSA) as an example, which specifies the relationship between test data and classification boundaries, for example, the deep learning model M composed of a group of neurons N is learned based on the training data set $T_r$ with class C. According to the expression of surprise adequacy, the activation trace of $T_r$ can be calculated as $A_N(T_r)$ based on the trained deep learning model M. Then, for the new test input x in class $c_x \in C$, its nearest neighbor in cx is represented as $x_a$. Finally, the surprise of x to class $c_x$ can be calculated as a distance between their activation traces $\alpha_N(*)$ as below:

$$x_a = \underset{x_i \in X \, s.t. \, c_{x_i} = c_x}{\mathrm{argmin}} \ \|\alpha_N(x) - \alpha_N(x_i)\| \quad (4)$$

$$dist_a = \|\alpha_N(x) - \alpha_N(x_a)\|$$

where |*| is a Euclidean distance. Subsequently, taking $x_a$ as a reference point, and its nearest neighbor $x_b$ is found in a class different from $c_x$, and the surprise between $x_a$ and $x_b$ can also be calculated as:

$$x_b = \underset{x_i \in X \, s.t. \, c_{x_i} \neq c_x}{\mathrm{argmin}} \ \|\alpha_N(x_a) - \alpha_N(x_i)\| \quad (5)$$

$$dist_b = \|\alpha_N(x_a) - \alpha_N(x_b)\|$$

The above two definitions are combined, and the surprise adequacy of test data x to the training data can be therefore defined as a ratio of $dist_a$ and $dist_b$ as follows:

$$DSA(x) = \frac{dist_a}{dist_b} \quad (6)$$

According to this definition, if the numerator is larger and the denominator is smaller, the value of the distance-based surprise adequacy DSA will be larger, indicating that test data x is a surprise relative to the data of class $c_x$ in the training set. Hence, the distance-based surprise adequacy DSA method can represent a method of surprises related to data and the training data based on distance, and can also help to describe the activation behavior related to data and the provided deep learning model. According to some embodiments of the present disclosure, the distance-based surprise adequacy DSA for corner case detection can be formalized to evaluate its ability to identify corner case data.

For example, test data itself can be used to calculate novelty. In an initial distance-based surprise adequacy DSA formula, the denominator is used to calculate the surprise of $x_a$ (the nearest neighbor of the test data in the same class) relative to other classes of data. Therefore, the distance-based surprise adequacy DSA is a comparison between the novelty of x to its own category and the novelty of its category to other categories, which can help to describe the surprise of test data relative to the whole training data. If it is to be determined whether a data sample is corner case data, its novelty relative to all categories can also be more critical. Therefore, the original distance-based surprise adequacy DSA can be changed only by modifying the definition of $dist_b$, as shown below:

$$x_b = \underset{x_i \in X \, s.t. \, c_{x_i} \neq c_x}{\mathrm{argmin}} \ \|\alpha_N(x) - \alpha_N(x_i)\| \quad (7)$$

$$dist_b = \|\alpha_N(x_a) - \alpha_N(x_b)\|$$

In formula (7), the calculation of the distance-based surprise adequacy DSA remains unchanged. This modification enables the distance-based surprise adequacy DSA to independently consider the surprise of test data x to all categories, and can help reflect the behavior of data in the corner case.

It should be understood that embodiments of the present disclosure are not limited to determining, based on a ratio of the first Euclidean distance to the second Euclidean distance, whether the first image belongs to the corner case image set, but can determine whether the first image belongs to the corner case image set, for example, by determining that at least one of the two distances meets the threshold.

Returning to image generation method 200, at block 206, computing device 110 trains an image generator with at least some images in the second plurality of images and guidance associated with the at least some images.

According to embodiments of the present disclosure, the guidance may include, for example, objects included in the image, such as birds, as well as the detailed description of birds, whether there is a special state in the image, such as fog, and so on. Meanwhile, the guidance may include at least one of image guidance and word guidance. Since the guidance associated with the at least some images is used to train the image generator, the guidance associated with the at least some images is a true and accurate description of at least some images.

At block 208, computing device 110 generates an additional image by the trained image generator with a first image in the second plurality of images and additional guidance, where the additional guidance is different from the guidance referred to in block 206, the latter guidance also being referred to in some embodiments herein as "first guidance."

According to embodiments of the present disclosure, the additional guidance is introduced to generate new images not included in the image set based on the images in the image set. Therefore, the additional guidance may not be a true description of the images in the image set. For example, when training the image generator, if an image including a black bird is entered, the corresponding guidance can be "the bird is black;" when the trained image generator is used to generate the additional image, although the input image can still be an image including a black bird, the corresponding additional guidance can be "the bird is white." At this time, the trained image generator can generate an image including a white bird as an additional image, which is different from the image in the image set, so it is an expansion of the image set.

According to some embodiments of the present disclosure, method 200 may include additional steps. For example, computing device 110 illustratively acquires a prompt associated with the first image in the second plurality of images, and generates a processed first image with the first image and the prompt. At this time, block 208 can be adjusted as that computing device 110 generates the additional image with the processed first image and the additional guidance. Generating the processed first image with the first image and the prompt can also be referred to as semantic alignment.

According to embodiments of the present disclosure, the prompt can be expert knowledge, it can be a special image selected from the image set, or it can be an image other than the image set. Meanwhile, similar to the guidance, the prompt may include at least one of an image prompt and a word prompt.

According to embodiments of the present disclosure, the first image may include an object, and the prompt can be associated with the object. At this time, generating the processed first image with the first image and the prompt may include removing the object from the first image based on the prompt.

Figure 4:
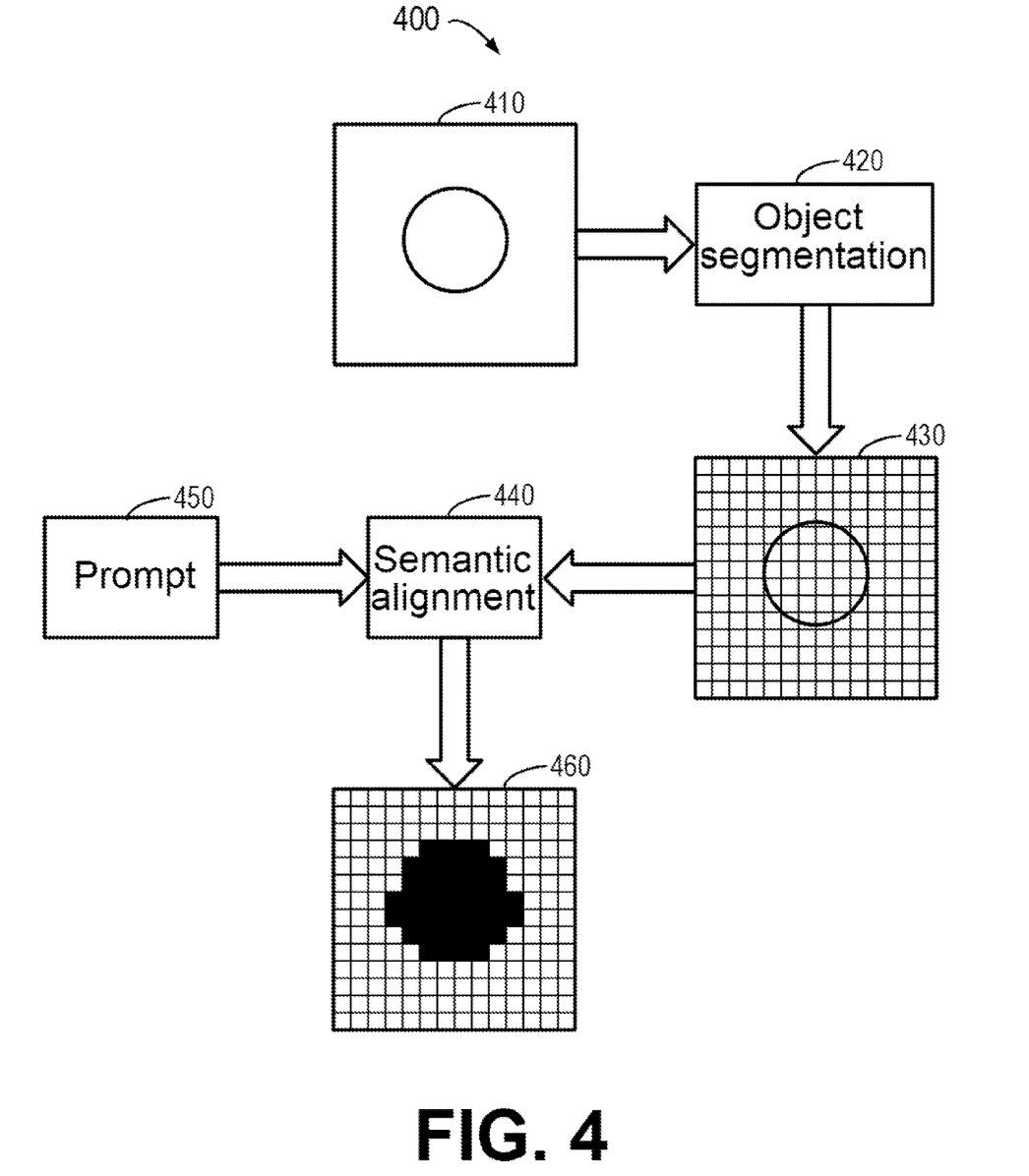
FIG. 4 shows a schematic diagram of an object-based semantic alignment process according to embodiments of the present disclosure.

FIG. 4 shows a schematic diagram of object-based semantic alignment process 400 according to embodiments of the present disclosure.

As shown in FIG. 4, first image 410 may include a sphere as an object, and first image 410 is processed by object segmentation 420 to generate first image 430 on which object segmentation has been performed. It can be seen that first image 410 has been segmented by object segmentation 420 into multiple small patches (that is, tags), and the sphere in first image 410 is included in several small patches.

Then, first image 430 on which object segmentation has been performed and input guidance 450 are processed by semantic alignment 440, and input guidance 450 can indicate that the object is to be removed or only indicate the object. After processing of semantic alignment 440, it can be seen that the small patches including the sphere have been removed or blackened in first image 430 on which object segmentation is performed, resulting in semantically aligned first image 460, which is the processed first image.

Because semantically aligned first image 460 (that is, the processed first image) that has been semantically aligned has removed the small patches including the object, when generating the additional image using the processed first image and the additional guidance, it is not necessary to use a converter to operate on the removed small patches, but only to operate on the small patches that have not been removed.

Another alternative embodiment of the above steps is described in detail below.

According to embodiments of the present disclosure, only image tags associated with the text may be changed. A converter generation model, an input text tag, and a visual guidance tag (gray/sketch images derived from input images) can be used to automatically regress and create image tags. In addition to the classification loss of each tag, the framework according to embodiments of the present disclosure can also adopt semantic loss in the training stage, so that the model can capture visual semantic alignment between the input text and the changed image. According to the framework work of embodiments of the present disclosure, a semantic alignment module is used in a reasoning stage to identify the text-related tags to be changed, and the generation model only manipulates these image tags.

An automatic encoder model according to embodiments of the present disclosure is responsible for down-sampling and quantizing the input image into discrete tags, while the converter model is responsible for fitting the joint distribution of image tags. These two models together constitute a converter-based image processing model.

The converter model based on the automatic encoder is composed of three parts, convolutional encoder E, convolutional decoder G, and codebook $Z \in \mathbb{R}^{K \times n_z}$ containing K potential variables of dimension $n_z$. These can all be learned. Given an image $X \in \mathbb{R}^{H \times W \times 3}$, convolution encoder E encodes an image into a two-dimensional potential feature map $Q \in \mathbb{R}^{h \times w \times n_z}$. The codebook is used to quantify the potential feature map by embedding each pixel into its closest potential variable in the codebook in an element-wise manner, as shown below:

$$\hat{Q}_{ij} = \mathrm{argmin}_k \|Q_{ij} - z_k\|^2 \quad (8)$$

For reconstruction, decoder G takes the quantized potential feature map $\hat{Q}$ as input and returns the generated image $\hat{X}$ close to the original image, that is $\hat{X} \approx X$.

For image generation, the quantized feature map Q can be modeled as a sequence of discrete tags and represented as a series of discrete tag indexes $I \in \{0, \ldots, K-1\}^{h \times w}$. Each tag roughly corresponds to an image patch of size $$\frac{H}{h} \times \frac{W}{w}.$$

Therefore, the prediction or the tag sequence is equivalent to a synthetic image. In practice, a one-way converter can be used to autoregressively predict the image sequence, as shown below:

$$P(I_{\leq i}|T) = \prod_j^i P(I_j|I_{<j}, T) \quad (9)$$

where T is a text tag sequence of captions paired with image X.

In order to introduce position information of two modes in the converter, two sets of position embedding can be used, one is axial position embedding of a visual sequence from spatial grids, and the other is sequence embedding as BERT for text sequences.

The autoregressive task minimizes cross entropy loss applied to the reconstruction of text tags and image tags respectively:

$$\mathcal{L}_{txt} = -\mathbb{E}_{T_1} \log P(T_i | T_{<i}) \quad (10)$$
$$\mathcal{L}_{img} = -\mathbb{E}_{I_1} \log P(I_i | I_{<i}, T)$$

At a top level, the converter model is responsible for determining basic image tags, and at a bottom level, the automatic encoder model is responsible for storing the convolution decoder that supplements texture details. In order to train these two models independently, a generation flow needs to be strictly divided. To achieve the goal, semantic loss for tag prediction can be included in one or more components of illustrative embodiments of the system. This loss not only considers downstream decoding, but also makes it easier to capture the links between text and image. CLIP is a visual and language represented learning model, which uses 400 million pairs of pictures and texts to be trained. By achieving excellent performance on the target of zero-shot image classification, it shows a strong visual semantic alignment ability. It is optimized by symmetric cross entropy loss performed across cosine similarity embedded in multiple different images and texts. The CLIP model can be used to guide tag prediction, for example, by the following formula:

$$\mathcal{L}_{semantic} = 1 - D(G(\hat{I}), T) \quad (11)$$

where D is the cosine similarity between the CLIP embedding of the two parameters of the CLIP, and the gradient back-propagation is realized through a straight-through estimator.

According to embodiments of the present disclosure, a semantic alignment module can be used in the reasoning stage to locate image patches that will be automatically changed by the input text. The semantic alignment module can be a two-step module. The first step is to locate a tag of each object, and the second step is to choose the object related to the text to be changed.

In the first step, object segmentation can be used to identify each object existing in the initial image X. The segmentation is carried out on the full size of the original image. The purpose of bilinear interpolation is to reduce a binary mask map of each object to the same size as the potential feature map Q. The tag at the same position is considered as part of the object, if the corresponding pixel has a value greater than zero.

The object tag can be located by comparing the bilinear interpolation algorithm and the maximum pooling algorithm.

According to one embodiment of the present disclosure, the maximum pooling algorithm expands the tag of bilinear interpolation.

According to another embodiment of the present disclosure, to obtain more accurate alignment, bilinear interpolation can be used to map segment mask and tag mask.

In the second step, an appropriate object can be chosen according to a text prompt to be set. To determine the degree of comparison between image tags and text tags, FILIP can be used, which is a CLIP style model optimized by marking a level similarity. Entities with a similarity score greater than 0 can be considered as text-related objects.

Related content of example image generation environment 100 in which a device and/or a method according to embodiments of the present disclosure can be implemented, image generation method 200 according to embodiments of the present disclosure, corner case image determining process 300 according to embodiments of the present disclosure, and object-based semantic alignment process 400 according to embodiments of the present disclosure are described above with reference to FIG. 1 to FIG. 4. It should be understood that the above description is to better demonstrate illustrative embodiments of the present disclosure, and is not intended to limit the present disclosure in any way.

It should be understood that the numbers of various elements and the magnitudes of physical quantities used in embodiments of the present disclosure and the drawings are only examples, and are not intended to limit the protection scope of embodiments of the present disclosure. The above numbers and magnitudes may be arbitrarily set as needed without affecting the normal implementation of embodiments of the present disclosure.

With reference to the description of FIG. 1 to FIG. 4, according to the technical solutions of embodiments of the present disclosure, a method for image generation is provided.

Specifically, the technical solutions according to embodiments of the present disclosure have many advantages compared with conventional solutions.

For example, unlike the previous semantic image synthesis work, which allows users to synthesize images with a certain number of semantic ideas related to semantic tags, the technical solution of the present disclosure focuses on modifying input images according to input data 120, so that it can be more flexible and allow an unlimited number of semantic concepts.

In addition, another problem to be solved by embodiments of the present disclosure is to train the model from scratch, rather than fine-tune the StyleGAN model commonly used in the current data synthesis algorithm, which can make the whole process more flexible.

Figure 5:
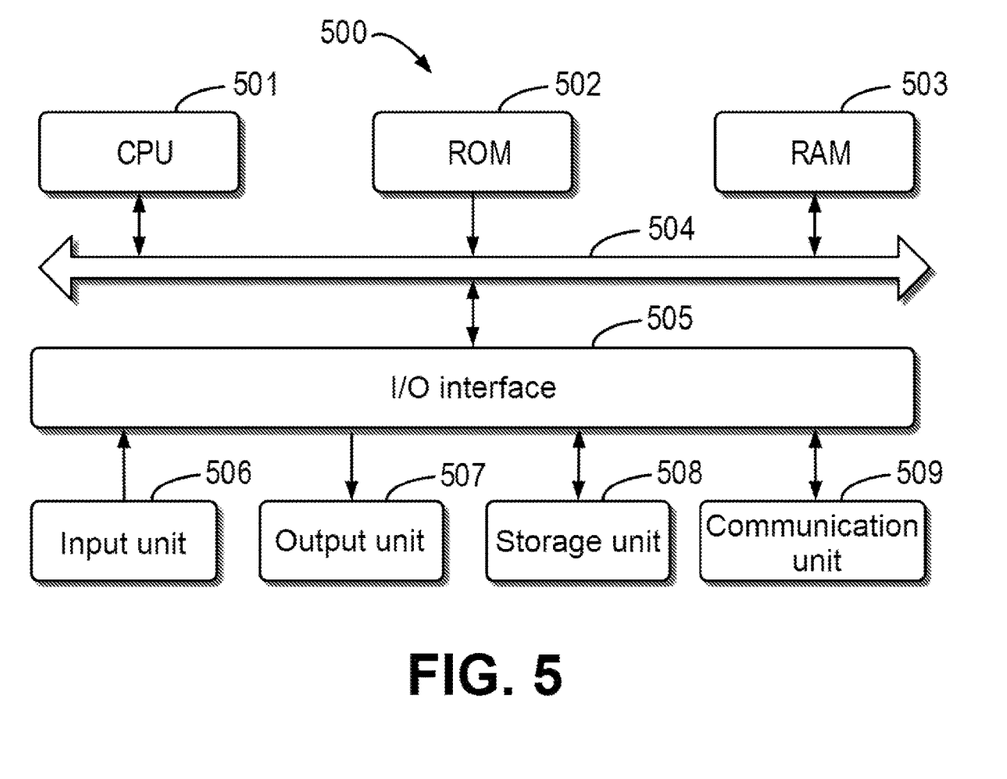
FIG. 5 is a block diagram of an example device that can be used to implement embodiments of the present disclosure.

FIG. 5 illustrates a block diagram of example device 500 that may be used to implement embodiments of the present disclosure. According to an embodiment of the present disclosure, computing device 110 in FIG. 1 may be implemented by device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for the operation of the device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing of method 200 described above, for example, may be performed by CPU 501. For example, in some embodiments, method 200 may be implemented as a computer software program that is tangibly included in a machine-readable medium such as storage unit 508. In some embodiments, part of or all the computer program may be loaded and/or installed to device 500 via ROM 502 and/or communication unit 509. When the computer program is loaded to RAM 503 and executed by CPU 501, one or more actions of method 200 described above may be executed.

Embodiments of the present disclosure may relate to a method, a device, a system, and/or a computer program product. The computer program product may include a computer-readable storage medium on which computer-readable program instructions for performing various aspects of embodiments of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples of the computer-readable storage medium as a non-exhaustive list include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage media used herein are not to be interpreted as transient signals per se, such as radio waves or other freely propagating electromagnetic waves, electromagnetic waves propagating through waveguides or other transmission media, for example, light pulses through fiber optic cables, or electrical signal transmitted via electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of embodiments of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to the user computer over any kind of networks, including a LAN or a WAN, or may be connected to the external computer, for example, through the Internet by using an Internet service provider. In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of embodiments of the present disclosure.

Various aspects of embodiments of the present disclosure are described herein with reference to the flow charts and/or block diagrams of the method, the device/system, and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for image generation, comprising:
acquiring an image set, wherein the image set comprises a first plurality of images that can be classified into at least two categories;
determining a corner case image set in the image set, wherein the corner case image set comprises a second plurality of images that tend to be incorrectly classified;
training an image generator with at least some images in the second plurality of images and first guidance associated with the at least some images; and
generating an additional image by the trained image generator with a first image in the second plurality of images and additional guidance, wherein the additional guidance is different from the first guidance, the additional guidance comprising input information that at least partially mischaracterizes a visual element detected in the first image, and further wherein the additional image is generated by the trained image generator as a modified version of the first image in the second plurality of images, at least in part by: (i) applying a segmentation process to the first image to segment at least the detected visual element into a plurality of segmented portions, and (ii) applying a semantic alignment process to the first image to alter at least a subset of the segmented portions of the first image to provide semantic consistency between the altered segmented portions and the input information, the additional image thereby differing from the first image in the second plurality of images in a manner controlled at least in part by the additional guidance, to provide an expansion of the image set.

2. The method for image generation according to claim 1, wherein determining the corner case image set in the image set comprises:
determining the corner case image set utilizing a distance-based surprise adequacy method.

3. The method for image generation according to claim 2, wherein determining the corner case image set utilizing the distance-based surprise adequacy method comprises:
determining an image classification space for the at least two categories based on the image set;
determining, for a first image in the first plurality of images, a first Euclidean distance between the first image and other images belonging to the same category in the image classification space and a second Euclidean distance between the first image and images belonging to other categories in the image classification space; and
determining, based on the first Euclidean distance and the second Euclidean distance, whether the first image belongs to the corner case image set.

4. The method for image generation according to claim 3, wherein determining, based on the first Euclidean distance and the second Euclidean distance, whether the first image belongs to the corner case image set comprises:
determining, based on a ratio of the first Euclidean distance to the second Euclidean distance, whether the first image belongs to the corner case image set.

5. The method for image generation according to claim 1, wherein the first guidance comprises at least one of the following:
image guidance; and
word guidance.

6. The method for image generation according to claim 1, further comprising:
acquiring a prompt associated with the first image in the second plurality of images;
generating a processed first image with the first image and the prompt; and
generating the additional image with the first image in the second plurality of images and the additional guidance comprising:
generating the additional image with the processed first image and the additional guidance.

7. The method for image generation according to claim 6, wherein the prompt comprises at least one of the following:
an image prompt; and
a word prompt.

8. The method for image generation according to claim 6, wherein the first image comprises an object, and the prompt is associated with the object.

9. The method for image generation according to claim 8, wherein generating the processed first image with the first image and the prompt comprises:
removing the object from the first image based on the prompt.

10. An electronic device, comprising:
at least one processing unit; and
at least one memory coupled to the at least one processing unit and storing instructions for execution by the at least one processing unit, wherein the instructions, when executed by the at least one processing unit, cause the electronic device to perform actions comprising:
acquiring an image set, wherein the image set comprises a first plurality of images that can be classified into at least two categories;
determining a corner case image set in the image set, wherein the corner case image set comprises a second plurality of images that tend to be incorrectly classified;
training an image generator with at least some images in the second plurality of images and first guidance associated with the at least some images; and
generating an additional image by the trained image generator with a first image in the second plurality of images and additional guidance, wherein the additional guidance is different from the first guidance, the additional guidance comprising input information that at least partially mischaracterizes a visual element detected in the first image, and further wherein the additional image is generated by the trained image generator as a modified version of the first image in the second plurality of images, at least in part by: (i) applying a segmentation process to the first image to segment at least the detected visual element into a plurality of segmented portions, and (ii) applying a semantic alignment process to the first image to alter at least a subset of the segmented portions of the first image to provide semantic consistency between the altered segmented portions and the input information, the additional image thereby differing from the first image in the second plurality of images in a manner controlled at least in part by the additional guidance, to provide an expansion of the image set.

11. The electronic device according to claim 10, wherein determining the corner case image set in the image set comprises:
determining the corner case image set utilizing a distance-based surprise adequacy method.

12. The electronic device according to claim 11, wherein determining the corner case image set utilizing the distance-based surprise adequacy method comprises:
- determining an image classification space for the at least two categories based on the image set;
- determining, for a first image in the first plurality of images, a first Euclidean distance between the first image and other images belonging to the same category in the image classification space and a second Euclidean distance between the first image and images belonging to other categories in the image classification space; and
- determining, based on the first Euclidean distance and the second Euclidean distance, whether the first image belongs to the corner case image set.

13. The electronic device according to claim 12, wherein determining, based on the first Euclidean distance and the second Euclidean distance, whether the first image belongs to the corner case image set comprises:
- determining, based on a ratio of the first Euclidean distance to the second Euclidean distance, whether the first image belongs to the corner case image set.

14. The electronic device according to claim 10, wherein the first guidance comprises at least one of the following:
- image guidance; and
- word guidance.

15. The electronic device according to claim 10, further comprising:
- acquiring a prompt associated with the first image in the second plurality of images;
- generating a processed first image with the first image and the prompt; and
- generating the additional image with the first image in the second plurality of images and the additional guidance comprising:
- generating the additional image with the processed first image and the additional guidance.

16. The electronic device according to claim 15, wherein the prompt comprises at least one of the following:
- an image prompt; and
- a word prompt.

17. The electronic device according to claim 15, wherein the first image comprises an object, and the prompt is associated with the object.

18. The electronic device according to claim 17, wherein generating the processed first image with the first image and the prompt comprises:
- removing the object from the first image based on the prompt.

19. A computer program product tangibly stored on a non-transitory computer-readable medium and comprising machine-executable instructions, wherein the machine-executable instructions, when executed by a machine, cause the machine to perform actions comprising:
- acquiring an image set, wherein the image set comprises a first plurality of images that can be classified into at least two categories;
- determining a corner case image set in the image set, wherein the corner case image set comprises a second plurality of images that tend to be incorrectly classified;
- training an image generator with at least some images in the second plurality of images and first guidance associated with the at least some images; and
- generating an additional image by the trained image generator with a first image in the second plurality of images and additional guidance, wherein the additional guidance is different from the first guidance, the additional guidance comprising input information that at least partially mischaracterizes a visual element detected in the first image, and further wherein the additional image is generated by the trained image generator as a modified version of the first image in the second plurality of images, at least in part by: (i) applying a segmentation process to the first image to segment at least the detected visual element into a plurality of segmented portions, and (ii) applying a semantic alignment process to the first image to alter at least a subset of the segmented portions of the first image to provide semantic consistency between the altered segmented portions and the input information, the additional image thereby differing from the first image in the second plurality of images in a manner controlled at least in part by the additional guidance, to provide an expansion of the image set.

20. The computer program product of claim 19, wherein determining the corner case image set in the image set comprises:
- determining the corner case image set utilizing a distance-based surprise adequacy method.

* * * * *